United States Patent [19]

Jaun

[11] Patent Number: 5,344,172
[45] Date of Patent: Sep. 6, 1994

[54] TRAILER HITCH ASSEMBLY SYSTEM

[76] Inventor: Fritz Jaun, 22060 Palo Way, Palo Cedro, Calif. 96073

[21] Appl. No.: 14,265

[22] Filed: Feb. 5, 1993

[51] Int. Cl.⁵ .............................................. B60D 1/52
[52] U.S. Cl. ............................. 280/415.1; 280/423.1; 280/433; 280/491.1
[58] Field of Search ............... 280/415.1, 416.1, 416.3, 280/417.1, 418.1, 423.1, 433, 438.1, 504, 496, 901, 491.1

[56] References Cited

U.S. PATENT DOCUMENTS

| | | | |
|---|---|---|---|
| 2,925,286 | 2/1960 | Hodges, Jr. et al. | 280/423.1 X |
| 4,183,548 | 1/1980 | Schneckloth | 280/433 |
| 4,546,994 | 10/1985 | Taylor | 280/423.1 |
| 4,921,266 | 5/1990 | Beals | 280/417.1 X |
| 5,016,898 | 5/1991 | Works et al. | 280/433 |
| 5,143,393 | 9/1992 | Meyer | 280/433 X |

*Primary Examiner*—Margaret A. Focarino
*Assistant Examiner*—Carla Mattix
*Attorney, Agent, or Firm*—Bielen, Peterson & Lampe

[57] ABSTRACT

A trailer hitch system utilizing a support member which includes a well that is accessible at the exterior of a vehicle. The support member is connected to the frame of the vehicle. A hitch element including a base portion, is capable of lying within the well of the support member such that a fitting for hitching a trailer is available for use external to the well. A lock removably holds the hitch element to base portion within the well. Thus a variety of hitch elements are interchangeable with the present assembly system.

16 Claims, 3 Drawing Sheets

TRAILER HITCH ASSEMBLY SYSTEM

CROSS-REFERENCE TO RELATED APPLICATIONS

The present application is a substitute for U.S. patent application Ser. No. 07/833,333 filed Apr. 20, 1992.

BACKGROUND OF THE INVENTION

The present invention relates to a novel hitch assembly system for a vehicle.

Vehicles such as pickup trucks are often used to tow trailers. To effect such function, trucks must be provided with trailer hitches which are normally placed on the bumper of the vehicle. In addition, other types of trailer hitch conversions require that the familiar goose neck or fifth wheel type trailer hitch be welded directly to the vehicle or to a structural member which is itself welded to a vehicle. The latter type of insulation generally mounts to the bed of a truck.

Although successful in providing a structure for towing trailers, the prior art installations are somewhat complicated and cumbersome. In the case of the trailer hitch mechanisms that are attached to the bed of a pickup truck, the trailer hitches often interfere with the load carrying function of the pickup truck. In addition, welding is generally required to install such mechanisms which is difficult to achieve and requires special skills. Trailer hitches that are attached to the bumper do not often have the towing capacity afforded by the goose neck or fifth wheel type of hitch systems fixed to a truck bed.

A trailer hitch assembly system which is simple to install, is easily removable to obviate interference, and provides either a goose neck or fifth wheel type of assembly would be a notable advance in the transportation field.

SUMMARY OF THE INVENTION

In accordance with the present invention a novel and useful trailer hitch assembly system is herein provided.

The trailer hitch assembly of the present invention utilizes a support member which is connected to the vehicle by mounting means. Such mounting means may be in the form of mechanical fasteners, including as bolts and screws. The support member may take the form of a rigid beam and includes a well which is accessible at the exterior of the vehicle. The well is formed in the support member by a wall which extends between the exterior of the vehicle and the support member. Of course, the well would be sized to fit a hitch element portion, such as a base portion thereof.

The mounting means, hereinbefore mentioned, positions the well of the support member such that the well only extends below the exterior surface of the vehicle. That is to say, the support member and well portion of the support member do not extend above the exterior surface of the vehicle, eg: above the surface of the bed of a pickup truck. The mounting means may include a plate which is connected to the frame of the vehicle. The support member would have a slot capable of engaging the portion of the plate in the form of a tongue. In addition, the mounting means may include a clamp which connects to the support member and releasably fixes the same to the frame of the vehicle.

Locking means is also included for removable holding the hitch element base portion within the well of the support member. Such locking means may include a stop limiting the travel of the hitch element relative to the well. In addition, where the well is formed by a wall appending from the mounting means, the locking means may include a pin or elongated member which is capable of penetrating the wall and engaging the base of the hitch element. Such elongated member may include a lever to easily engage and remove the elongated member from its locking position.

The trailer hitch element may include a goose neck or fifth wheel receiver to accommodate different towing assemblies. Hitch elements are thus interchangeable in the system of the present invention. Further, the well of the exterior surface or bed of the vehicle may be capped or otherwise temporarily sealed when no hitch element is being used with the vehicle trailer hitch assembly. In this manner the well cavity is enclosed.

It may be apparent that a novel and useful trailer hitch system has been described.

It is therefore an object of the present invention to provide a trailer hitch system which is easy to install on a vehicle and does not interfere with a load carrying function of the vehicle.

It is another object of the present invention to provide a trailer hitch assembly system which converts a pickup truck to a tractor for trailers.

Another object of the present invention is to provide a trailer hitch assembly system which requires no welding for its installation and may easily be removed when not desired for use.

The invention possesses other objects and advantages especially as concerns particular characteristics and features thereof which will become apparent as the specification continues.

For a better understanding of the invention reference is made to the following detailed description of the preferred embodiments thereof which should be referenced to the prior described drawings.

DESCRIPTION OF THE PREFERRED EMBODIMENTS

Various aspects of the present invention will evolve from the detailed description of the preferred embodiments thereof which should be taken in conjunction with the prior described drawings.

Figures 1, 2:
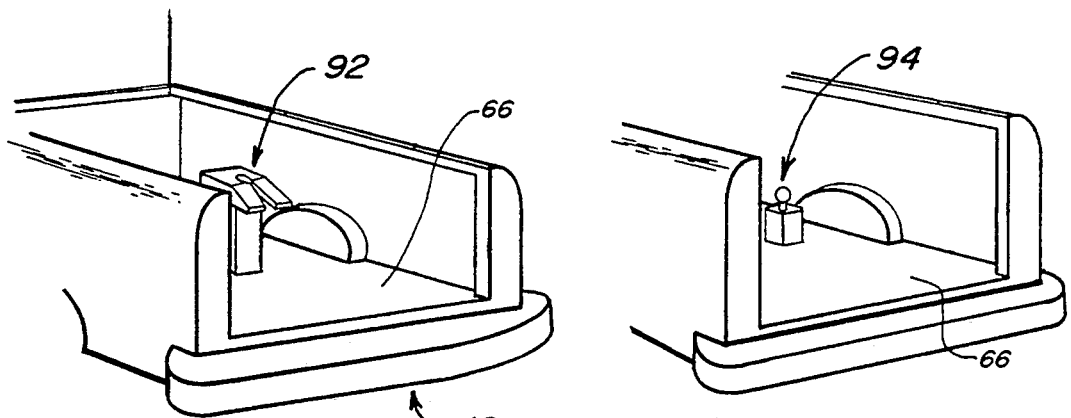
FIG. 1 is a partial perspective view of a pickup truck having a fifth wheel receiver in place utilizing the present invention.
FIG. 2 is a partial perspective view of a pickup truck having a goose neck receiver in place utilizing the present invention.
Figure 3:
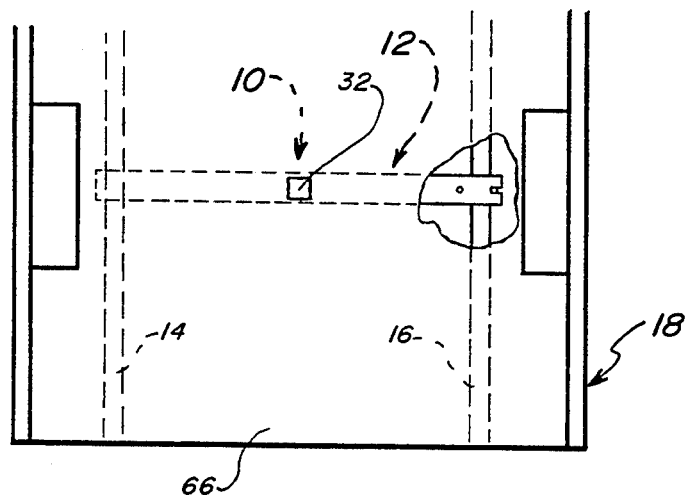
FIG. 3 is a top plan view of a bed portion of a pickup truck showing a portion of the hitch assembly in phantom and in whole, through a cut-out portion.
Figure 4:
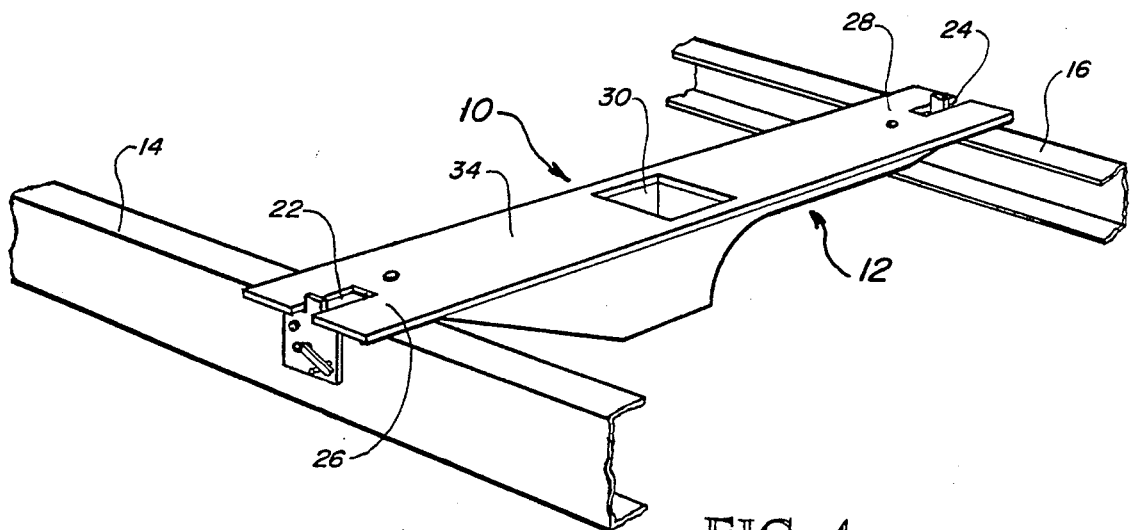
FIG. 4 is a perspective view of the hitch assembly of the present invention installed on a pickup truck frame partially depicted.
Figure 5:
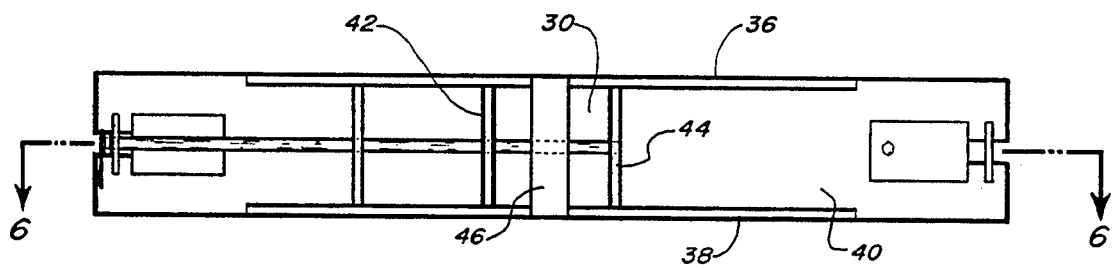
FIG. 5 is a bottom plan view of the trailer hitch assembly system of the present invention.

The invention as a whole is depicted in the drawings by reference character 10. The trailer hitch assembly system 10 includes as one of its elements a support member 12 which is constructed of any rigid material such as metal, reinforced plastic, and the like. Support member 12 is intended for connection to frame components 14 and 16 which are shown as U-shaped channel bars, FIG. 4.

Support member 12 is formed with a flat bar 20 having notches 22 and 24 at end portions 26 and 28 respectively. Well 30 includes an opening 32 which is found on the top surface 34 of flat bar 20. Well 20 is formed by a pair of skirts 36 and 38 which extend upwardly from bottom surface 40 of flat bar 20. Walls 42 and 44 complete the enclosure of well 30, which is substantially in the shape of a rectangular solid. Strap 46 serves as stop means 48 for base portion 50, FIG. 6 of a trailer receiver, which will be discussed in detail hereinafter.

Figure 7:
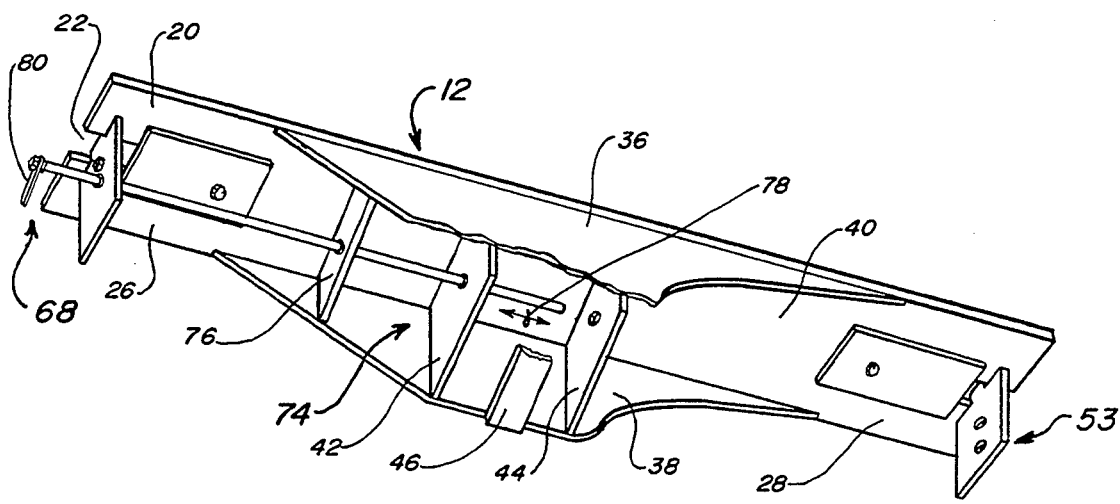
FIG. 7 is a bottom front perspective view of the trailer hitch assembly system of the present invention.
Figure 8:
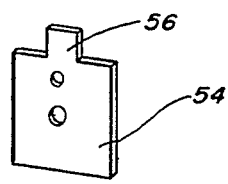
FIG. 8 is a perspective view of the mounting plate portion of the present invention.
Figure 9:
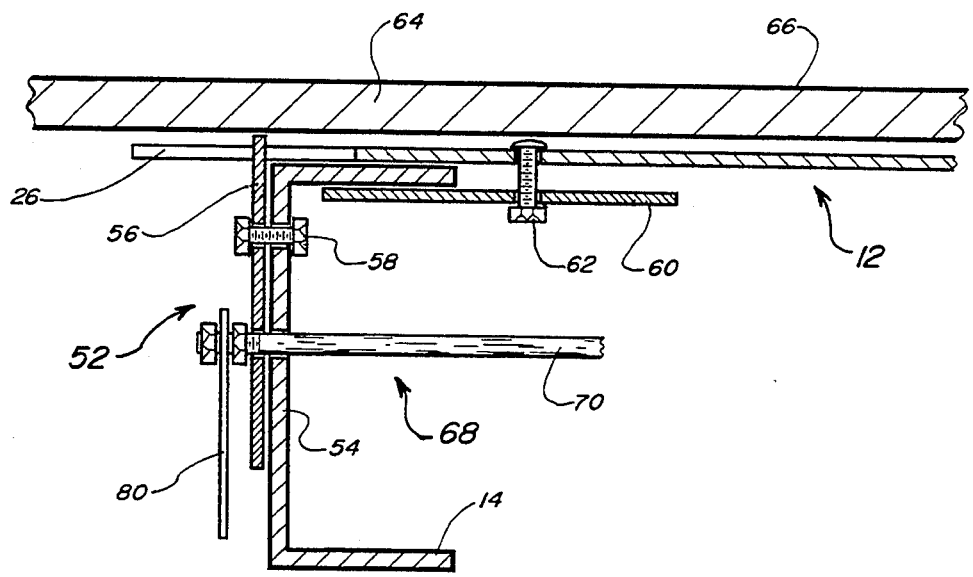
FIG. 9 is a sectional view taken along line 9—9 of FIG. 6 emphasizing the mounting means employed in connecting the support member to the frame of a pickup truck.

With reference to FIGS. 7, 8, and 9, it may be observed that mounting means 52 is included in the present invention for connecting support member 12 to channel bars 14 and 16. Referring to FIG. 9 in particular, mounting means 52 possesses a plate 54 formed with a tongue 56 which is intended for fitting within notches 22 or 24 of support member 12, FIG. 8. Bolt 58 is employed to hold plate 54 to channel bar 14 and to provide longitudinal buttressing to support member 12 by the interaction of tongue 56 and notch 22. Plate 60 serves as a clamp in conjunction with bolt 62, which passes through plate 60 and support member 12. Plate 60 and nut and bolt 62 provide vertical stability to support member 12. Although depicted in a loosened condition in FIG. 9, nut and bolts 58 and 62 would be tightened to hold end portion 26 of support member 12 in place with respect to channel bar 14. It should be understood that end portion 28 of support member 12 is held to channel bar 16 by similar mounting means. When installed, support member 12 lies between channel bars 14 and 16 and the exterior shell 64 of pickup truck 18. In the embodiment depicted in the drawings, exterior shell 64 is the bed of pickup truck 18 possessing a upper surface 66.

Figure 6:
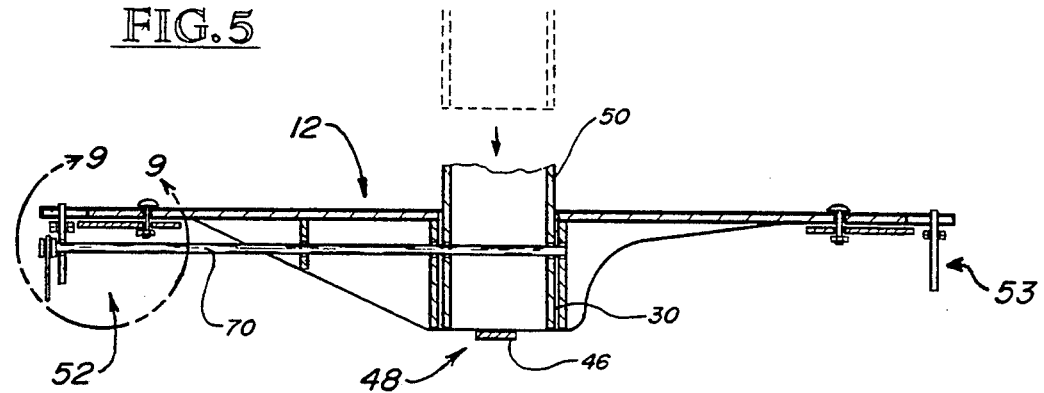
FIG. 6 is a sectional view taken along line 6—6 of FIG. 5 and depicting the trailer hitch base in phantom relative to the well of the structural member of the present invention.

Locking means 68, FIGS. 6 and 7, includes an elongated member or rod 70 which extends through one of the plurality of openings of plate 54 through a plurality of openings 74 in support web 76 and walls 42 and 44, directional arrow 78. Elongated member 70 terminates in a lever or handle 80, FIG. 7, to aid in the manipulation of the same through the openings heretofore described.

Figure 10:
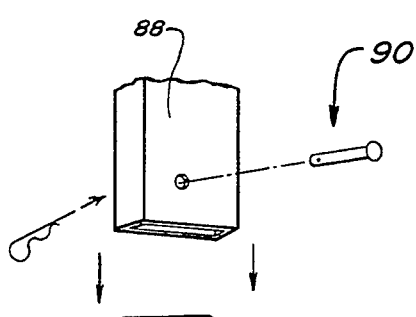
FIG. 10 is an exploded view showing an adjustable base for a trailer hitch.
Figure 10:
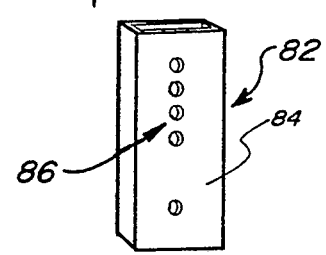
Figure 10:
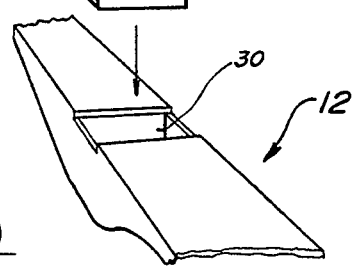
Figure 11:
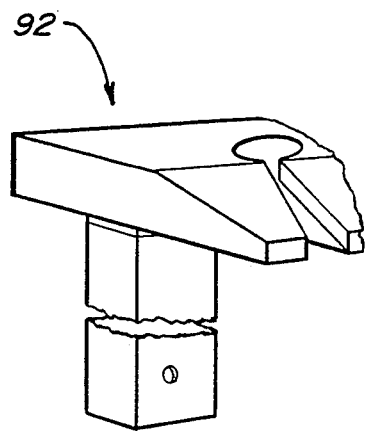
FIG. 11 is a perspective view of a fifth wheel type of trailer hitch.
Figure 12:
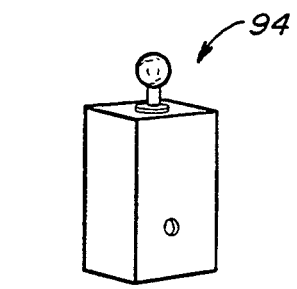
FIG. 12 is a perspective view of a goose neck type trailer hitch.
Figure 13:
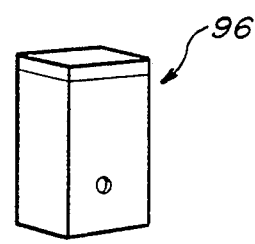
FIG. 13 is a perspective view of a plug employed to occupy the well of the support member when no receiver is used on a pickup truck.

Referring to FIGS. 10–13, it may be observed that various types of trailer hitch receivers are shown. FIG. 10 depicts an adjustable receiver possessing a base portion 84 having a plurality of openings 86 for accepting elongated member 70 at various positions within well 30. Overlying portion 88 telescopes relative base portion 84 and is held in place by locking pin or securing clip mechanism 90. FIGS. 11 and 12 depicts types of receivers which may be fixed to overlying portion 88. Fifth wheel receiver 92 and goose neck receiver 94 are, thus, interchangeably installed on trailer hitch system 10. Needless to say, other receivers may also be used in the present system 10. Plug 96, FIG. 13, may be used to fill well 30 when no receiver is being employed.

In operation, system 10 is installed on a pickup truck 18 by connecting support member 12 to channel bars 14 and 16 beneath bed 64 of pickup truck 18. Mounting means 52 is employed in this regard and requires the drilling of appropriate holes through channel bars 14 and 16, FIG. 9. Well 30 would be aligned with opening 32 through bed 64 of pickup truck 18, provided through surface 66 thereof. Receivers 92 and 94 may then be placed within well 30 of system 10 and lock into place by locking means 68. Either fifth wheel receiver 92 or goose neck receiver 94 may be used in this regard to tow a trailer. Plug 96 would be employed when neither receiver is in use to provide a smooth surface on truck bed 64 when cargo is being hauled or truck bed 64 is used for other purposes.

While in foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. A trailer hitch system for a vehicle comprising:
   a. a support member, said support member including a well accessible at the exterior surface of the vehicle;
   b. mounting means for connecting said support member to the vehicle such that said well only extends below the exterior surface of the vehicle, said mounting means including a clamp connected to said support member for releasably fixing said support member to the frame of the vehicle, said clamp comprising a first plate substantially vertically disposed and mated to said support member, a first holding means for holding said first plate to the frame of the vehicle, a second plate substantially horizontally disposed, and a second holding means for sandwiching the frame of the vehicle between said second plate and said support member;
   c. a hitch element said hitch element including a base portion capable of lying within said well of said support member, said hitch element further including a fitting for hitching a trailer; and
   d. locking means for removably holding said hitch element base portion within said well of said support member.

2. The system of claim 1 in which said hitch element is slidable relative to said well of said support member and additionally comprises stop means for arresting sliding of said hitch element base portion relative to said well of said support member.

3. The system of claim 2 in which said mounting means connects said support member to the frame of the vehicle, said well of said support member is formed by a wall appended to said support member, and said locking means includes an elongated member capable of penetrating said wall and engaging said base of said hitch element.

4. The system of claim 1 in which said mounting means includes a plate connected to the frame of the vehicle, said support member having a slot capable of engaging a portion of said plate.

5. The system of claim 3 in which said elongated member further includes a lever handle.

6. The system of claim 1 in which said hitch element fitting includes a goose neck receiver.

7. The system of claim 1 in which said hitch element fitting includes a fifth wheel receiver.

8. The system of claim 3 in which said stop means includes a multiplicity of apertures in said wall forming said well of said support member, and said elongated member being capable of passing through each of said multiplicity of apertures.

9. The system of claim 8 in which said elongated member further includes a securing clip for confining said elongated member to any of said multiplicity of apertures in said wall forming said well of said support member.

10. A trailer hitch assembly system for use with a hitch element comprising:
   a. a support member, said support member including a well accessible at the exterior of the vehicle, the hitch element fitting within said well;
   b. mounting means for connecting said support member to the vehicle; said mounting means further including a clamp for releasably fixing said support member to the frame of the vehicle, said clamp comprising a first plate substantially vertically disposed and mated to said support member, a first holding means for holding said first plate to the frame of the vehicle, a second plate substantially horizontally disposed, and a second holding means for sandwiching the frame of the vehicle between said second plate and said support member, and
   c. locking means for removably holding at least a portion of the hitch element within said well of said support member.

11. The system of claim 10 in which the hitch element is slidable relative to said well of said support member and additionally comprises stop means for arresting sliding of the hitch element relative to said well of said support member.

12. The system of claim 11 in which the mounting means connects said support member to the frame of the vehicle, said well of said support member is formed by a well appended to said support member, and said locking means includes an elongated member capable of penetrating said wall and engaging said base of said hitch element.

13. The system of claim 12 in which said mounting means includes a plate connected to the frame of the vehicle, said support member having a slot capable of engaging a portion of said plate.

14. The system of claim 13 in which said elongated member further includes a lever handle.

15. The system of claim 14 in which said stop means includes a multiplicity of apertures in said wall forming said well of said support member, said elongated member being capable of passing through each of said multiplicity of apertures.

16. The system of claim 15 in which said elongated member further includes a securing clip for confining said elongated member to any of said-multiplicity of apertures in said wall forming said well of said support member.

* * * * *